United States Patent
Zimmer et al.

(10) Patent No.: US 7,660,977 B2
(45) Date of Patent: Feb. 9, 2010

(54) SYSTEM AND METHOD TO CONTROL MICROCODE UPDATES AFTER BOOTING AN OPERATING SYSTEM IN A COMPUTING PLATFORM

(75) Inventors: Vincent J. Zimmer, Federal Way, WA (US); Gundrala D. Goud, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 11/450,854

(22) Filed: Jun. 8, 2006

(65) Prior Publication Data

US 2007/0300050 A1    Dec. 27, 2007

(51) Int. Cl.
*G06F 9/445* (2006.01)
(52) U.S. Cl. .................. 713/1; 713/2; 713/100
(58) Field of Classification Search ........ 713/1, 713/2, 100
See application file for complete search history.

(56) References Cited

U.S. PATENT DOCUMENTS

| | | | | |
|---|---|---|---|---|
| 4,128,874 | A | * | 12/1978 | Pertl et al. ............ 710/36 |
| 5,557,777 | A | * | 9/1996 | Culbert ............ 713/2 |
| 5,844,986 | A | | 12/1998 | Davis |
| 5,950,012 | A | | 9/1999 | Shiell et al. |
| 6,026,016 | A | * | 2/2000 | Gafken ............ 365/185.04 |
| 6,571,347 | B1 | * | 5/2003 | Tseng ............ 714/6 |
| 6,711,675 | B1 | * | 3/2004 | Spiegel et al. ............ 713/2 |
| 7,003,676 | B1 | | 2/2006 | Weber et al. |
| 7,039,725 | B1 | * | 5/2006 | Player ............ 709/250 |
| 7,089,414 | B2 | * | 8/2006 | Langford et al. ............ 713/2 |
| 7,143,255 | B2 | * | 11/2006 | De Santis et al. ............ 711/163 |
| 7,353,375 | B2 | * | 4/2008 | Cepulis ............ 713/1 |

FOREIGN PATENT DOCUMENTS

EP    1617328    1/2006

OTHER PUBLICATIONS

How BIOS Works from: http://computer.howstuffworks.com/bios.htm/printable by Jeff Tyson.
Intel—IA-32 Intel Architecture Software Developer's Manual—vol. 3: System Programming Guide 2002.
Intel—Intel Itanium Architecture Software Developer's Manual vol. 2: System Architecture—Rev. 2.1 Oct. 2002.
International Search Report for corresponding matter P23179PCT dated Oct. 30, 2007.

* cited by examiner

*Primary Examiner*—Nitin C Patel
(74) *Attorney, Agent, or Firm*—Joni D. Stutman

(57) ABSTRACT

An embodiment of the invention is meant to prevent/allow microcode updates after an operating system is booted on a platform. A processor includes a lock directive that, when set, prevents microcode updates to occur after the operating system has been booted. In an embodiment, the lock directive is read during boot of the processor. A lock indicator is then written to an accessible location so that an attempt to patch, or update, microcode after the operating system has booted will be prohibited if the lock indicator indicates that microcode patch updates are not allowed. Other embodiments are also described and claimed.

20 Claims, 4 Drawing Sheets

SYSTEM AND METHOD TO CONTROL MICROCODE UPDATES AFTER BOOTING AN OPERATING SYSTEM IN A COMPUTING PLATFORM

BACKGROUND

1. Technical Field

The present disclosure relates generally to information processing systems and, more specifically, to boot processing for computer systems.

2. Background Art

Before a computer system can operate, it must have an operating system (OS) in its memory that allows the computer's resources to be reached and controlled by the other software, such as the various application programs. The computer hardware has a non-volatile, comparatively simple bootstrap program to perform a boot sequence and load the operating system from disk. Typically, the bootstrap program is invoked by a BIOS (basic input/output system) program.

While most of the hardware of a computer system is provided by the computer vendor, the BIOS is typically provided by third party vendors, so the computer vendor has limited knowledge of, and control over, the specific contents of these items. However, the computer vendor may become aware of microcode patches that should be loaded during the boot process.

Regarding microcode patches, a typical instruction in a CISC (complex instruction set computer) computer processor performs a series of operations, with microinstructions that define some of the more complex operations being encoded in a non-volatile storage area in the form of microcode. The microcode defines all or a portion of the executable instruction set for the processor, and may also define internal operations that are not implemented in software-accessible code. The microcode is typically placed in a read-only memory (ROM) within the processor at the time the processor is manufactured. However, microcode sometimes needs to be modified after the processor is manufactured, and even after the processor has been placed into operation. Microcode patches allow such modification by adding additional microinstructions or inserting new microinstructions in place of the original microinstructions.

The microcode patches can be delivered to the processor in various ways. One manner of delivering patches is that the processor may support a field-upgradeable mechanism for the microcode ROM store; this mechanism is referred to as the microcode update. The microcode patches supported by the microcode update allow for changes to the microcode ROM in the field, in order to address errata, etc.

Some third-party vendors do not wish to support the microcode update mechanism. This is because the microcode update mechanism allows patches to be loaded via an interface to the operating system after the computer system (including BIOS code) has otherwise been validated by the third-party vendor. The ability of a user or IT department to load patches utilizing the microcode update mechanism after the system has been validated and shipped by the third party vendor may cause stability, quality and validation issues against the platform state that was shipped from the third-party vendor's factory. That is, subsequent patches may obviate the validation of the system, causing quality issues for a previously validated system, thereby reflecting poorly on the third party vendor that validated the system. Accordingly, at least some third-party platform vendors would prefer to incorporate all patches into a BIOS that has been fully updated with all microcode patches, validate the system, and know that no future microcode patches can be loaded later by the operating system.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of systems, methods and mechanisms to disable field update of microcode patches in order to maintain early hardware configuration state.

DETAILED DESCRIPTION

The following discussion describes selected embodiments of methods, systems and mechanisms to disable microcode patches in order to maintain an early hardware configuration state. The apparatus, system and method embodiments described herein may be utilized with single-core or multi-core systems. In the following description, numerous specific details such as processor types, boot processing, multithreading environments, system configurations, and circuit layout have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

Figure 1:
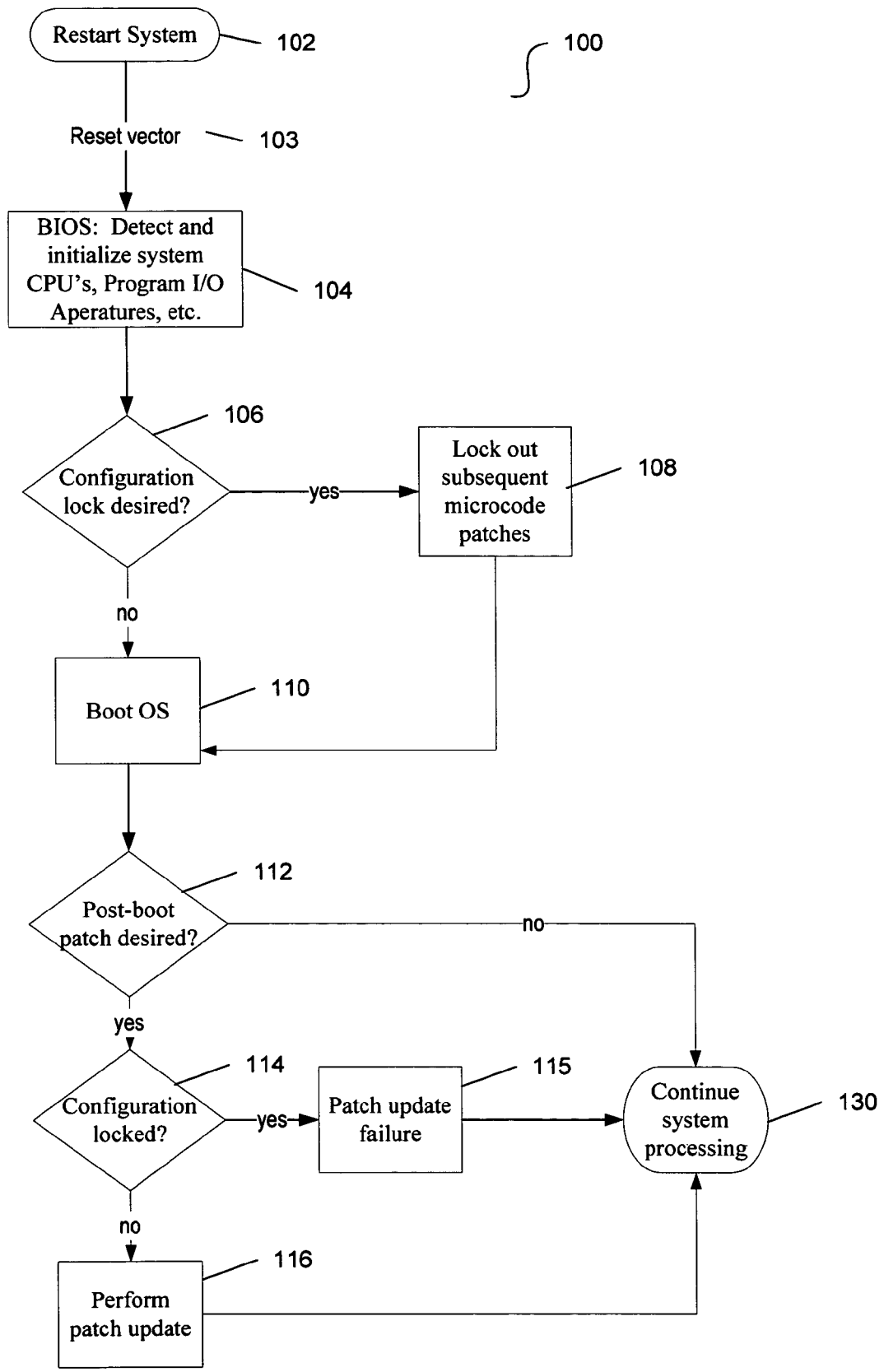
FIG. 1 is a flowchart illustrating at least one embodiment of a method for preventing subsequent microcode updates after an operating system has been loaded.

FIG. 1 is a flowchart illustrating at least one embodiment of a method 100 for preventing subsequent microcode updates after an operating system has been loaded. The method may be performed, for at least one embodiment, by a processing system 300, 400 such as embodiments of those illustrated in FIGS. 3 and 4.

FIG. 1 illustrates that processing for the method 100 begins at block 102, where the computer system is restarted. That is, in many common processing systems, the boot process is started with a restart function of some kind. This might be a cold restart (power to the hardware is initially off), a warm restart (the hardware is already powered up), or one of several other starting conditions. A transition out of sleep or hibernate states may be a warm restart.

The reset function typically resets hardware to a known state and generates a reset interrupt, which vectors the system to a program in non-volatile memory and begins execution from that point. For at least one embodiment, hardware registers, such as model-specific registers (discussed below) are cleared of previous contents during the reset 102.

FIG. 1 illustrates that the reset vector 103 is dispatched responsive to the system reset event 102. The reset vector 103 causes a Basic Input-Output System (BIOS) program (typically stored in flash memory) to be invoked at block 104.

FIG. 1 illustrates that the BIOS program is initiated at block 104; the BIOS program enables basic input-output (IO) control. Typically, the BIOS has no information about the environment required by the operating system and therefore can do nothing to initialize the system beyond putting the hardware into a known state. At block 104, the BIOS code performs typical start-up functions such as initializing memory, detecting all system CPU's, and initializing I/O apertures.

Regarding the detection of CPU's, for at least one embodiment the method 100 is performed on a chip multiprocessor (CMP) system that includes a plurality of CPU's. Each of these CPU's is detected at block 104. If the method 100 is instead performed for a system having a single CPU, the single CPU is detected at block 104.

Regarding I/O apertures, such initialization at block 104 may include determining that I/O communication pathways (such as, e.g., a PCI bus) are responding properly, initializing a chipset, etc. Other additional processing may be performed by the BIOS at block 104, such as loading any microcode patches that have been incorporated into the BIOS code.

From block 104, processing proceeds to block 106. At block 106, the BIOS code determines whether the third party vendor has indicated that post-boot microcode updates should be disabled. If so, processing proceeds to block 108. Otherwise, processing proceeds to block 110.

For at least one embodiment, the evaluation at block 106 evaluates to "true" if BIOS code encounters a "lock" directive. For at least one embodiment, it is anticipated that the third party vendor has placed the lock directive into the BIOS code. The lock directive may be, for example, a write instruction to write a particular value to a particular storage location, such as a register or memory variable. The directive may be an architectural instruction, such as a write MSR (WRMSR) instruction. Alternatively, the directive may be a procedure call, such as a call to the PAL_PROC_DISABLE_PAL_UPDATE procedure discussed below.

The value that is written by the lock directive indicates that subsequent microcode updates are to be disabled. This value is referred to herein as the lock indicator.

At block 108, subsequent microcode updates are disabled. This may be accomplished, for example, by writing a particular value to a dedicated register or memory location or variable that is designated to store the lock indicator. The disabling 108 may be performed by BIOS execution of a lock directive referred to in the preceding paragraph. As is indicated above, the lock directive may be an architectural instruction or, in the alternative, may be a call to a procedure or function.

For at least one embodiment, subsequent microcode updates are disabled at block 108 by executing an instruction that sets a bit in a model-specific register (MSR). As used herein, the term model-specific register (MSR) is intended to mean one of an implementation-specific set of registers that are defined for a specific processor or set of processors. More information about MSR's may be found at Section 9.4 and Appendix B of IA-32 Intel® Architecture Software Developer's Manual, Volume 3: System Programming Guide, 2002.

Any otherwise unused (e.g., "reserved") bit in any model-specific register may be utilized for this purpose. For at least one embodiment, for example, bit zero of MSR #17h for an IA32 processor may be utilized for this purpose. The bit may be treated as a write-once lock bit that, when set, prevents the processor from accepting microcode updates.

It is not required that the register utilized to maintain this lock bit be an MSR. The lock indicator may be maintained in any register, memory location, variable, or other storage location that has been dedicated to store the lock indicator. For simplicity, the lock bit is referred to hereinafter as being maintained in a "lock register". From block 108, processing proceeds to block 110.

At block 110, BIOS processing is completed and the operating system is booted. For at least one embodiment, the BIOS branches at block 110 into an option ROM to enable the options that are active in that particular system, and then branches back into the BIOS program to complete initialization and load the OS into main memory from a disk.

Processing proceeds from block 110 to block 112. After the OS has been booted at block 112, normal system processing is performed. At block 112, it is determined during normal system processing that a post-boot microcode update is desired. Such determination may evaluate to "true" upon receipt of a signal, such as an INT15h-based interface signal, that indicates that software, such as a driver, is attempting to request a microcode update. Further information regarding the INT15h-based interface may be found at section 9.11.4.4 et seq., IA-32 Intel® Architecture Software Developer's Manual, Vol. 3: System Programming Guide, 2002.

If the determination at block 112 evaluates to true, then processing proceeds to block 114. Otherwise, normal system processing continues at block 130.

At block 114, the lock register is queried to determine whether the write-once lock bit has been set. If so, then the microcode update is not performed and instead fails 115. The failure may either be recorded or may instead be a silent failure. For a recorded failure, a failure bit may be set in a status register (not shown) of the processor. Processing then proceeds to block 130, where normal system processing continues.

If, instead, it is determined at block 114 that the write-once lock value has not been set, then the post-boot microcode update is performed at block 116. The processing at block 116 may include verification of the patch before it is loaded. Processing then proceeds to block 130, where normal system processing continues.

While the embodiment described in connection with FIG. 1 assumes that post-boot microcode updates are performed in response to an INT15h-based interface signal, the invention is not so limited. Other embodiments may perform microcode updates in different manners, such as a UEFI (see, for instance, www*uefi*org) Update Capsule runtime interface. One of skill in the art will recognize that similar processing to perform the functions set forth in FIG. 1 may be performed for these other embodiments. It should be noted that periods are replaced with asterisks in URLs in this document to prevent inadvertent hperlinks.

For at least one alternative embodiment, the method 100 may be performed on a system that utilizes a Processor Abstraction Layer (PAL) to perform patch updates in the field. The PAL layer may provide a layer of abstraction that "hides" the hardware MSR's from software. Further description of the PAL may be found in Intel® Itanium® Architecture Software Developer's Manual, Volume 2: System Architecture, Rev. 2.1, October 2002. For such embodiment, the post-boot patches that are prohibited by the method 100 are not patches to microcode, but instead are patches to macrocode such as the PAL-A//B components. Such embodiment may be applicable, for example, to systems based on Itanium® or Itanium® 2 processors available from Intel Corporation.

For such alternative embodiment, the mechanism to lock out patches at block 108 may not involve a direct write to an MSR register. Instead, locking at block 108 may be performed in response to a trusted PAL call. For example, a new PAL procedure called PAL_PROC_DISABLE_PAL_UPDATE may be utilized to change the hardware state of the processor such that subsequent microcode updates via PAL are disabled. For at least one embodiment, the PAL_PROC_DISABLE_PAL_UPDATE procedure may have an index of 77 (e.g., value of argument 0 is index 77) and may be callable in physical mode.

Figure 2:
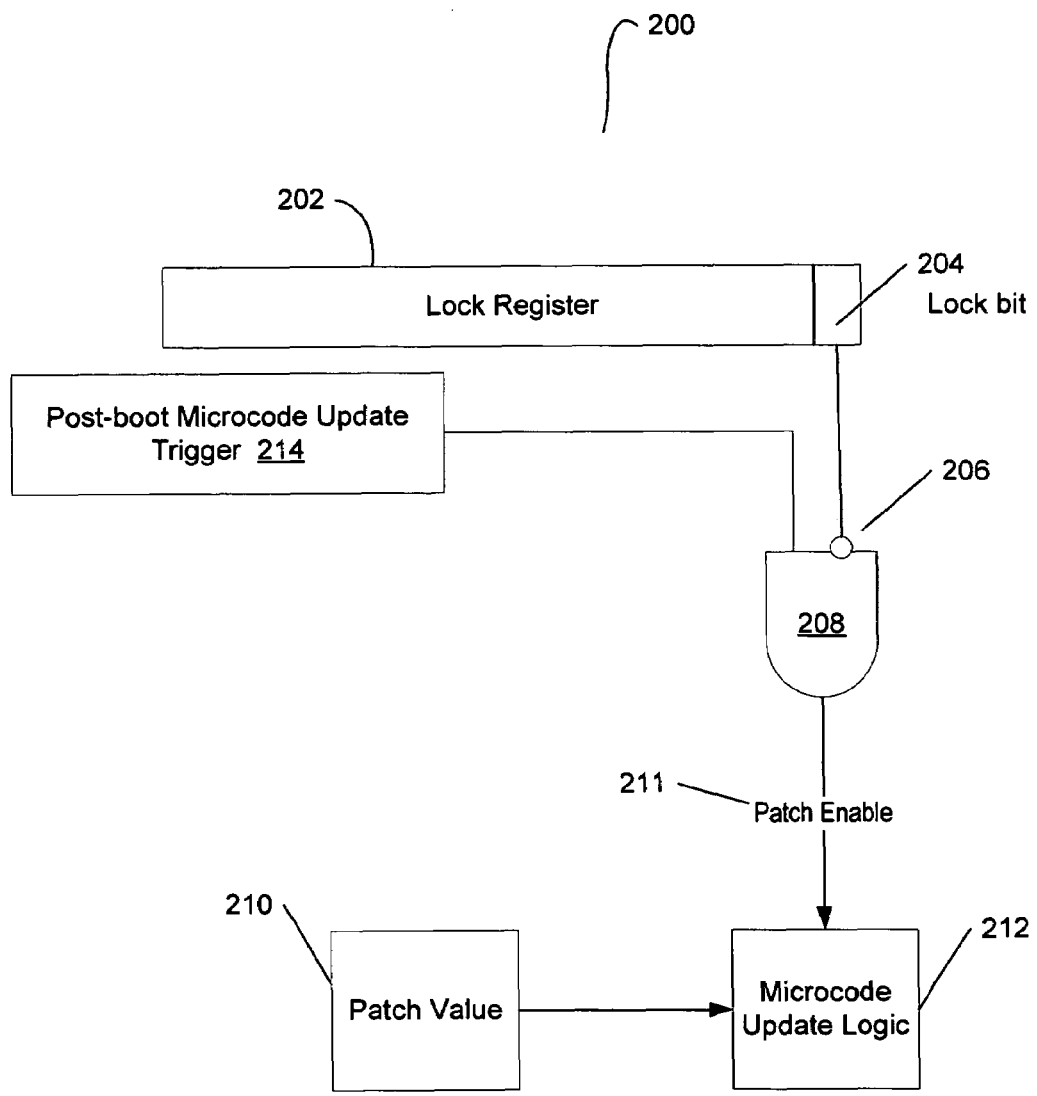
FIG. 2 is a block diagram illustrating at least one embodiment of a circuit to perform locking of microcode updates in order to preserve an early hardware configuration state.

FIG. 2 is a block diagram illustrating at least one embodiment of logic 200 to perform locking of microcode updates in order to preserve an early hardware configuration state. FIG. 2 is discussed herein with reference to FIG. 1.

FIG. 2 illustrates an embodiment of the lock register 202 that was discussed above in connection with block 108. As was discussed above, the lock register 202 may be any register or memory storage space allocated for holding the lock indicator 204. For at least one embodiment, the lock indicator is a single bit 204. The lock indicator bit 204 may be a designated bit of a model specific register, such as MSR #17h (IA31_Platform_ID) for certain processors available from Intel Corporation. The bit may be written directly by software via a write MSR instruction for a first embodiment of the circuit 200. For another embodiment of the logic 200, such as one implemented for a system that utilizes PAL, the lock indicator bit may be written by a function or procedure, such as the PAL_PROC_DISABLE_PAL_UPDATE procedure discussed above.

FIG. 2 illustrates that the value of the lock bit 204 may be provided as an input to AND gate 208. For at least one embodiment, the value may be inverted via inverter 206 before being supplied as an input to the AND gate 208. The AND gate 208 represented in FIG. 2 is just one embodiment of a logic element that may generate the patch enable signal. Any other logic, including a logic gate, firmware, or software, may be utilized to achieve the function represented by the AND gate 208 in FIG. 2. The logic function shown by the AND gate 208 may generally be referred to herein as "patch enable logic."

FIG. 2 illustrates that another input to the AND gate 208 may be a trigger value 214 that indicates that a post-boot microcode update is desired, as discussed above in connection with block 112 of FIG. 1. The trigger value 214 may be provided, for example, by an MSR or other register that, when written, causes a microcode patch to be loaded. The trigger value 214 may be set as a result of a communication in accordance with the Int15h-based interface, which is a BIOS interface that allows microcode updates to be dynamically added to the system flash. As is indicated above, further discussion of the Int15h interface may be found in the IA-32 Intel® Architecture Software Developer's Manual, Vol. III, Chapter 9.11.4.4 et seq.

FIG. 2 illustrates that the trigger value 214 may be overridden if the lock bit 204 is set. If, however, both the trigger value 214 and the lock bit 204 are true, then the AND gate 208 produces a "true" patch enable signal 211, which enables the microcode update logic 212 to load the desired patch 210 from a designated BIOS scratchpad into the flash memory of the system.

Figure 3:
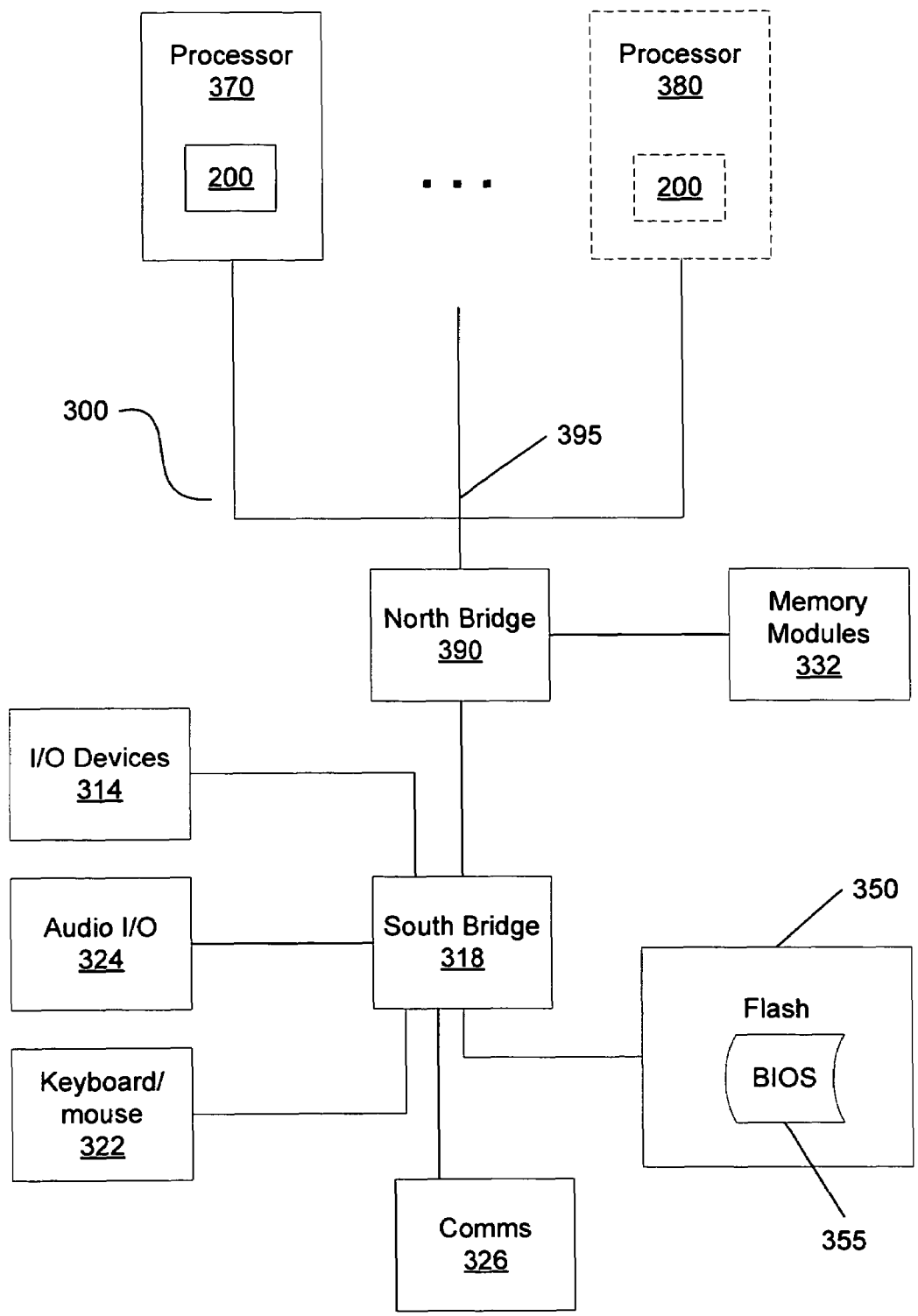
FIG. 3 is a block diagram of a multiprocessor system in accordance with an embodiment of the present invention that includes multi-drop bus communication pathways.

The flash memory 350 is shown in FIG. 3, which is a block diagram of a first embodiment of a system 300 capable of performing disclosed techniques. The system 300 may include one or more processors 370, 380, which are coupled to a north bridge 390. The optional nature of additional processors 380 is denoted in FIG. 3 with broken lines.

First processor 370 and any other processor(s) 380 (and more specifically the cores therein) may include patch prevention logic 200 in accordance with an embodiment of the present invention (see 200 of FIG. 2).

The north bridge 390 may be a chipset, or a portion of a chipset. The north bridge 390 may communicate with the processor(s) 370, 380 and control interaction between the processor(s) 370, 380 and memory 332. The north bridge 390 may also control interaction between the processor(s) 370, 380 and Accelerated Graphics Port (AGP) activities. For at least one embodiment, the north bridge 390 communicates with the processor(s) 370, 380 via a multi-drop bus, such as a frontside bus (FSB) 395.

FIG. 3 illustrates that the north bridge 390 may be coupled to another chipset, or portion of a chipset, referred to as a south bridge 318. For at least one embodiment, the south bridge 318 handles the input/output (I/O) functions of the system 300, controlling interaction with input/output components. Various devices may be coupled to the south bridge 318, including, for example, a keyboard and/or mouse 322, communication devices 326 and flash memory 350 which may include code BIOS code 355, in one embodiment. Further, an audio I/O 324 may be coupled to the south bridge 318, as may be other I/O devices 314.

Figure 4:
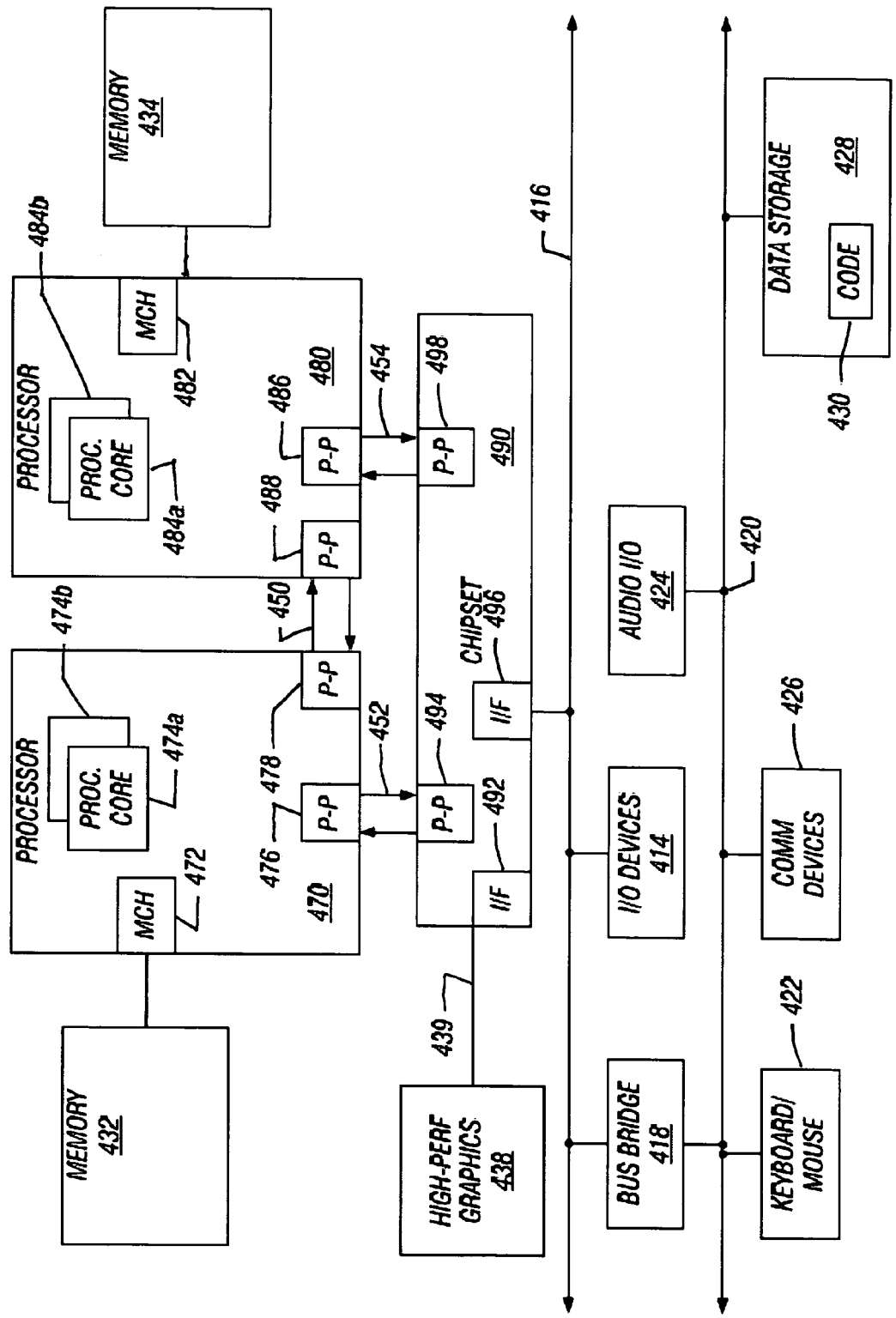
FIG. 4 is a block diagram of a multiprocessor system in accordance with an embodiment of the present invention that includes point-to-point interconnects.

Embodiments may be implemented in many different system types. Referring now to FIG. 4, shown is a block diagram of a multiprocessor system in accordance with an embodiment of the present invention. As shown in FIG. 4, the multiprocessor system is a point-to-point interconnect system, and includes a first processor 470 and a second processor 480 coupled via a point-to-point interconnect 450. As shown in FIG. 4, each of processors 470 and 480 may be multicore processors, including first and second processor cores (i.e., processor cores 474a and 474b and processor cores 484a and 484b). While not shown for ease of illustration, first processor 470 and second processor 480 (and more specifically the cores therein) may include patch prevention logic in accordance with an embodiment of the present invention (see 200 of FIG. 2).

Rather having a north bridge and south bridge as shown above in connection with FIG. 3, the system 400 shown in FIG. 4 may instead have a hub architecture. The hub architecture may include an integrated memory controller hub Memory Controller Hub (MCH) 472, 482 integrated into each processor 470, 480. A chipset 490 may provide control of Graphics and AGP.

Thus, the first processor 470 further includes a memory controller hub (MCH) 472 and point-to-point (P-P) interfaces 476 and 478. Similarly, second processor 480 includes a MCH 482 and P-P interfaces 486 and 488. As shown in FIG. 4, MCH's 472 and 482 couple the processors to respective memories, namely a memory 432 and a memory 434, which may be portions of main memory locally attached to the respective processors.

While shown in FIG. 4 as being integrated into the processors 470, 480, the memory controller hubs 472, 482 need not necessarily be so integrated. For at least one alternative embodiment, the logic of the MCH's 472 and 482 may be external to the processors 470, 480, respectively. For such embodiment one or more memory controllers, embodying the logic of the MCH's 472 and 482, may be coupled between the processors 470, 480 and the memories 432, 434, respectively. For such embodiment, for example, the memory controller(s) may be stand-alone logic, or may be incorporated into the chipset 490.

First processor 470 and second processor 480 may be coupled to the chipset 490 via P-P interconnects 452 and 454, respectively. As shown in FIG. 4, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision* 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420. Note that other architectures are possible. For example, instead of the point-to-point architecture of FIG. 4, a system may implement a multi-drop bus or another such architecture.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and nonvolatile memory and/or storage elements), at least one input device, and at least one output device.

Program code may be applied to input data to perform the functions described herein and generate output information. Accordingly, alternative embodiments of the invention also include machine-accessible media containing instructions for performing the operations of the invention or containing design data, such as HDL, that defines structures, circuits, apparatuses, processors and/or system features described herein. Such embodiments may also be referred to as program products.

Such machine-accessible media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language While particular embodiments of the present invention have been shown and described, it will be obvious to those skilled in the art that changes and modifications can be made without departing from the scope of the appended claims. For example, the foregoing mechanism for preventing post-boot updates of microcode may be equally applicable, in other embodiments, to updates of other types of code rather than being limited to microcode stored in flash memory. For one such alternative embodiment, for example, the mechanisms and methods described herein may be utilized to prevent post-boot loading of other types of code patches, including macro-code or a collection of instructions encoded in the main instruction set.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A system, comprising:
   a processor having microcode and further having a dedicated storage location to store a lock indicator value;
   a memory coupled to the processor, said memory to store boot instructions, wherein said boot instructions include a lock directive to set the lock indicator value to a first value during booting of the processor and prior to booting an operating system;
   said processor further comprising logic to prevent update of said microcode if said lock indicator value matches the first value, wherein said logic is patch enable logic to receive said lock indicator value from a lock register and to receive a trigger value, the patch enable logic to generate a patch enable signal; and
   said logic further to allow update of said microcode if said lock indicator value matches a second value.

2. The system of claim 1, wherein:
   said memory is a flash RAM.

3. The system of claim 1, further comprising:
   a DRAM memory module.

4. The system of claim 1, wherein:
   said dedicated storage location further comprises a bit of a register.

5. The system of claim 1, wherein:
   said lock directive is an architectural instruction of the processor.

6. The system of claim 1, wherein:
   said lock directive is an procedure call for a processor abstraction layer of the processor.

7. The system of claim 1, wherein:
   said logic is further to prevent update of said microcode after booting of the operating system if said lock indicator value matches the first value.

8. The system of claim 4, wherein:
   said register is a model specific register.

9. The system of claim 1, wherein said patch enable logic further comprises:
   microcode update logic to receive the patch enable signal and a patch value, the microcode update logic to load the patch value into a flash memory, responsive to a true value for the patch enable signal.

10. The system of claim 1, wherein:
    said patch enable logic is to generate a false value for the patch enable signal if the lock indicator value is true.

11. The system of claim 1, further comprising:

an inverter coupled between said lock register and the patch enable logic, the inverter to invert the lock indicator value before providing it to the patch enable logic.

12. A method comprising:

loading one or more microcode patches into flash memory before an operating system is booted; and setting a lock indicator, before the operating system is booted, to prevent any microcode updates from occurring after said booting of said operating system, wherein if said lock indicator value matches a first value then preventing update of the said microcode, wherein the preventing comprises patch enable logic to receive said lock indicator from a lock register and to receive a trigger value, the patch enable logic to generate a patch enable signal.

13. The method of claim 12, further comprising:

incorporating instructions to perform said loading into basic input-output system (BIOS) code.

14. A computer readable storage medium having a plurality of machine accessible instructions stored thereon, the instructions when executed on a machine cause the machine to:

load one or more microcode patches into flash memory before an operating system is booted; and set a lock indicator, before the operating system is booted, to prevent any microcode updates from occurring after said booting of said operating system, wherein if said lock indicator value matches a first value then prevent update of the said microcode, wherein the preventing comprises patch enable logic to receive said lock indicator from a lock register and to receive a trigger value, the patch enable logic to generate a patch enable signal.

15. The medium of claim 14, further comprising instructions that when executed cause the machine to:

set a lock indicator further comprise an architecturally defined instruction.

16. The medium of claim 14, wherein said lock indicator further comprises a bit in a register of the processor.

17. The medium of claim 16, wherein said register comprises a model-specific register.

18. The medium of claim 17, wherein said instructions that provide for setting a lock indicator further comprise an architectural instruction to write to the model-specific register.

19. The medium of claim 14, wherein said instructions that provide for setting a lock indicator further comprise a procedure call.

20. The article of claim 19, wherein said instructions further comprises instructions for the procedure call, the instructions for the procedure call including an instruction to set a bit of a model-specific register.

* * * * *

UNITED STATES PATENT AND TRADEMARK OFFICE
CERTIFICATE OF CORRECTION

PATENT NO. : 7,660,977 B2 Page 1 of 1
APPLICATION NO. : 11/450854
DATED : February 9, 2010
INVENTOR(S) : Zimmer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 572 days.

Signed and Sealed this

Fourth Day of January, 2011

David J. Kappos
*Director of the United States Patent and Trademark Office*